(12) United States Patent
Sherif et al.

(10) Patent No.: US 11,055,593 B1
(45) Date of Patent: Jul. 6, 2021

(54) PROVIDING ALERTS VIA A COLOR CHANGING TRANSACTION CARD

(71) Applicant: Capital One Services, LLC, McLean, VA (US)

(72) Inventors: Timur Sherif, Washington, DC (US); Cara Weikel, McLean, VA (US); Steve Blanchet, Leesburg, VA (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/735,782

(22) Filed: Jan. 7, 2020

(51) Int. Cl.
| | | |
|---|---|---|
| G06K 5/00 | (2006.01) | |
| G06K 7/08 | (2006.01) | |
| G06K 19/077 | (2006.01) | |
| B42D 25/378 | (2014.01) | |
| G07F 7/08 | (2006.01) | |
| G06Q 20/34 | (2012.01) | |

(52) U.S. Cl.
CPC ..... *G06K 19/07707* (2013.01); *B42D 25/378* (2014.10); *G06Q 20/342* (2013.01); *G06Q 20/352* (2013.01); *G07F 7/0833* (2013.01); *G07F 7/0846* (2013.01)

(58) Field of Classification Search
USPC ........................................ 235/380, 451, 492
See application file for complete search history.

(56) References Cited

U.S. PATENT DOCUMENTS

| | | | |
|---|---|---|---|
| 7,628,336 B2 | 12/2009 | Reynolds et al. | |
| 9,483,920 B1* | 11/2016 | Anderson | ........ G06K 19/07705 |
| 10,102,520 B1 | 10/2018 | Anderson et al. | |
| 10,497,325 B1* | 12/2019 | Staton | ................... F21S 43/255 |
| 10,635,961 B1* | 4/2020 | Rings | ................... G06Q 20/352 |
| 2006/0065741 A1* | 3/2006 | Vayssiere | ......... G06K 19/07703 235/492 |
| 2006/0132895 A1* | 6/2006 | Miyazaki | ............. G02B 26/026 359/296 |
| 2008/0238865 A1* | 10/2008 | Maeda | ................... G09G 3/344 345/107 |
| 2009/0078938 A1* | 3/2009 | Yamazaki | ........... H01L 27/1214 257/59 |

(Continued)

OTHER PUBLICATIONS

Jun. 25, 2019, Roger J. Mortimeter, Switching Colors with Electricity. American Scientists, pp. 1-36.
Nov. 2014, A Guide to EMV Chip Technology. v.2.0, pp. 1-36.

*Primary Examiner* — Tuyen K Vo
(74) *Attorney, Agent, or Firm* — Banner & Witcoff, Ltd.

(57) ABSTRACT

Methods and systems disclosed herein may communicate information, such as alerts and notifications, to a cardholder via a color-changing transaction card. In particular, the cardholder may configure one or more thresholds that establish when a transaction card may change colors. For instance, a transaction card may change colors at, or while approaching, a first threshold. The transaction card may change colors at, or while approaching, a second threshold. When the cardholder's balance goes below the thresholds, the transaction card may revert back to the lower threshold color or the original color of the transaction card. Using the techniques described herein a financial institution may convey information to a cardholder in a way that does not require the cardholder to digital engage with the financial institution.

16 Claims, 9 Drawing Sheets

(56) References Cited

U.S. PATENT DOCUMENTS

| | | | |
|---|---|---|---|
| 2011/0284632 A1* | 11/2011 | Mullen | G07F 7/088 |
| | | | 235/380 |
| 2012/0236391 A1* | 9/2012 | Miyamoto | G02F 1/167 |
| | | | 359/296 |
| 2013/0314764 A1* | 11/2013 | Doi | G02F 1/167 |
| | | | 359/296 |
| 2014/0268302 A1* | 9/2014 | Fujimori | G02F 1/167 |
| | | | 359/296 |
| 2016/0342064 A1* | 11/2016 | Gila | G06F 1/1652 |
| 2017/0293901 A1* | 10/2017 | Savla | G06Q 20/387 |
| 2018/0239958 A1* | 8/2018 | Leoni | B41J 3/4076 |
| 2018/0284528 A1* | 10/2018 | Gila | G09F 9/372 |
| 2018/0286335 A1* | 10/2018 | Zhu | G02F 1/163 |
| 2019/0385171 A1* | 12/2019 | Cheng | G06Q 20/3278 |

* cited by examiner

PROVIDING ALERTS VIA A COLOR CHANGING TRANSACTION CARD

FIELD OF USE

Aspects of the disclosure relate generally to transaction cards and more specifically to color changing transaction cards.

BACKGROUND

When financial institutions wish to convey account information to a cardholder, the cardholder, oftentimes, engages with the financial institution through an app on their mobile device, a website, or telephonically. This engagement typically involves login procedures or entering account information to obtain balances or spending limits. The entire process is time-consuming and irritating. Moreover, attempts at conveying information via the transaction card itself often fall short. In this regard, transaction cards that convey information to a cardholder include a power source built-in to the transaction card. However, when a cardholder forgets to charge his/her transaction card, or the power source is simply drained, the information may not be displayed to the cardholder, thereby rendering the information sharing component of the transaction card moot.

Aspects described herein may address these and other problems, and generally improve the quality, efficiency, and speed of conveying account information to a cardholder in a way that does not require the cardholder to engage with a financial institution or a power source incorporated in the transaction card.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Methods and systems disclosed herein may communicate information, such as alerts and notifications, to a cardholder via a color-changing transaction card. In particular, the cardholder may configure one or more thresholds that establish when a transaction card may change colors. For instance, a transaction card may change colors at, or while approaching, a first threshold. The transaction card may change colors at, or while approaching, a second threshold. When the cardholder's balance goes below the thresholds, the transaction card may revert back to the lower threshold color or the original color of the transaction card.

In order to realize the color-changing transaction card, the present disclosure describes a plurality of embodiments. For example, a microparticle-based medium may be used to effectuate the color-change. In this regard, a microparticle-based medium may apply an electrical charge to change the color of the transaction. Further, the microparticle-based medium may not need a power source located on the transaction card to make, and maintain, the color change. In another example, one or more electrochemical cells may be used to realize the color change. Similar to the microparticle-based medium, the one or more electrochemical cells may not require power on the transaction card to effectuate, and maintain, the color change. In a final example, a liquid crystal field may be used to effectuate a temporary color change. Accordingly, using the techniques described herein a financial institution may convey information to a cardholder in a way that does not require the cardholder to digital engage with the financial institution.

These features, along with many others, are discussed in greater detail below.

DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for providing alerts and/or notifications via a color changing transaction card. Traditional color-changing transaction cards include a built-in power source. However, when a cardholder forgets to charge his/her transaction card, or the power source is simply drained, the transaction card will not change colors, rendering any alerts and/or notifications moot.

Methods and systems disclosed herein may communicate information, such as alerts and notifications, to a cardholder via a color-changing transaction card that may not require a built-in power source. The cardholder may configure, via a mobile app or a website, one or more thresholds that establish when a transaction card may change colors. For instance, a transaction card may change colors at, or while approaching, a first threshold. The transaction card may change colors at, or while approaching, a second threshold. When the cardholder's balance goes below the thresholds, the transaction card may revert back to the lower threshold color or the original color of the transaction card.

In order to realize the color-changing transaction card, the present disclosure describes a plurality of embodiments. For example, a microparticle-based medium may be used to effectuate the color-change. In this regard, a microparticle-based medium may apply an electrical charge to change the color of the transaction. Further, the microparticle-based medium may not need a power source located on the transaction card to make, and maintain, the color change. In another example, one or more electrochemical cells may be used to realize the color change. Similar to the microparticle-based medium, the one or more electrochemical cells may not require power on the transaction card to effectuate, and maintain, the color change. In a final example, a liquid crystal field may be used to effectuate a temporary color change. Accordingly, using the techniques described herein a financial institution may convey information to a cardholder in a way that does not require the cardholder to digital engage with the financial institution.

Figure 1:
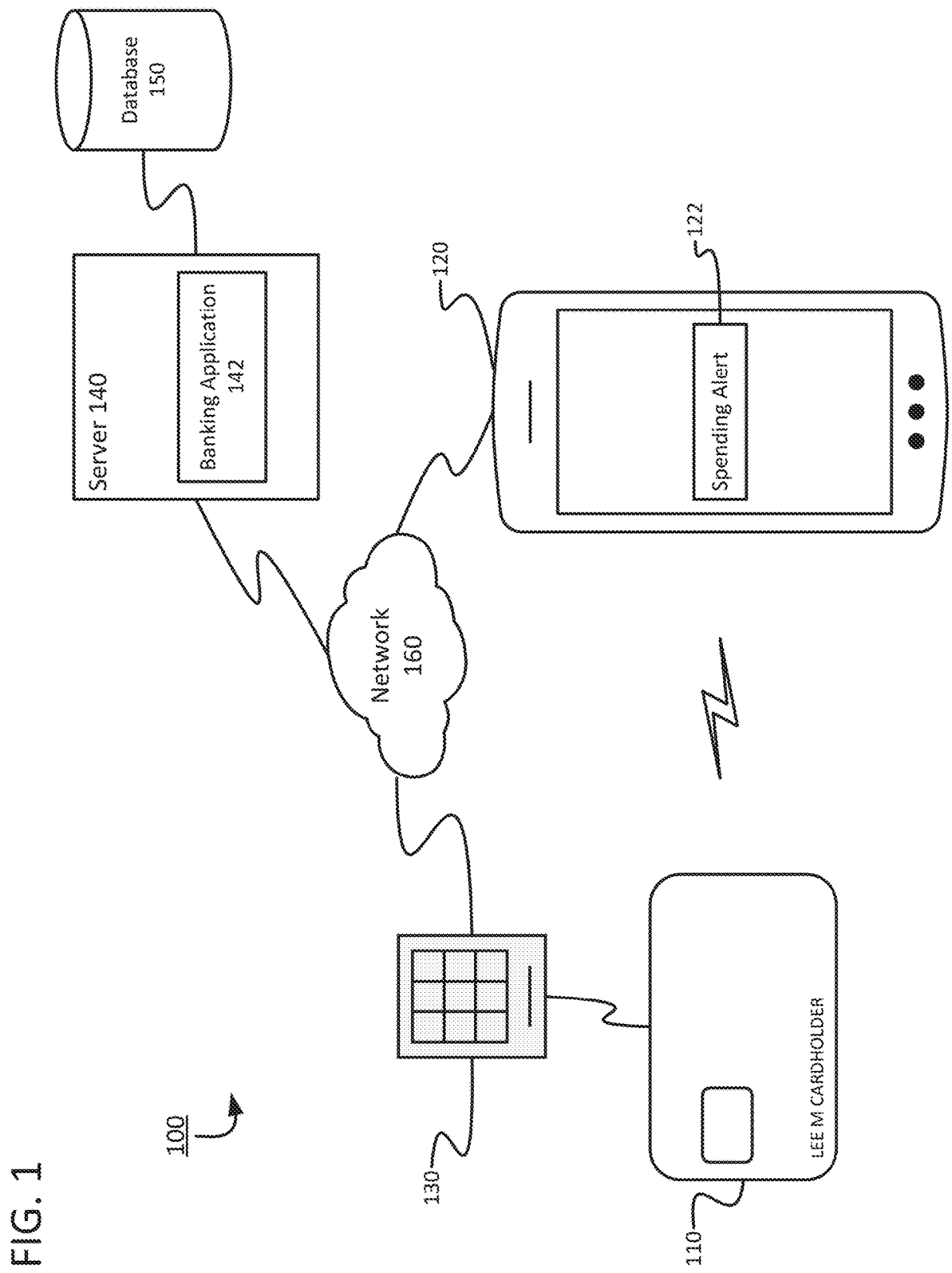
FIG. 1 shows an example of a system in which one or more aspects described herein may be implemented.

Oftentimes, there are several components at work when transacting using a transaction card, such as a debit card or a credit card. FIG. 1 shows a system 100 that illustrates several of the components that may be found when conducting a transaction with a transaction card. For example, system 100 shows transaction card 110 communicatively coupled to device 120 and card reader 130. Additionally, system 100 shows device 120 and card reader 130 communicatively coupled to server 140, which may include database 150, via network 160.

Transaction card 110 may be any suitable card configured to permit a cardholder to access funds in one or more of a cardholder's account. In this regard, transaction card 110 may be a credit card, a charge card, a debit card, a prepaid card, a payment card, or the like. In some embodiments, transaction card 110 may provide access to one or more types of accounts. For instance, transaction card 110 may allow a cardholder to select from a credit card option and/or a debit card option. As will be discussed in greater detail with respect to FIG. 2, transaction card 110 may be a chip-enabled card. In some embodiments, transaction card 110 may include a magnetic strip, in addition to the chip. In further embodiments, transaction card 110 may include near field communication (NFC) capabilities, short-range wireless communication capabilities (e.g., Bluetooth®), wireless communication capabilities (e.g., Wi-Fi), or any combination thereof. The NFC capabilities, short-range wireless communication capabilities, wireless communication capabilities may be referred to collectively as communication capabilities. These communication capabilities may permit transaction card to communicate with device 120 and card reader 130. Additionally, transaction card 110 may include a color-changing mechanism, which is discussed in greater detail below.

Device 120 may be a mobile device, such as a cellular phone, a mobile phone, a smart phone, a tablet, a laptop, or the like. Alternatively, device 120 may be any suitable internet-enabled device, such as a smart speaker, smart television, or the like. Device 120 may be configured to provide a first cardholder with access to various applications and services. For example, device 120 may provide the first cardholder with access to the Internet. Additionally, device 120 may provide the first cardholder with one or more applications located thereon. The one or more applications may provide the first cardholder with a plurality of tools and access to a variety of services. In some embodiments, the one or more applications may include an application, such as a banking application or credit card application, that allows the first cardholder to set up spending alerts and notifications. The alerts and notifications may include push notifications, such as alert 122. Alternatively, or additionally, the alerts and notifications may include configuring a color-changing mechanism on transaction card 110. That is, the cardholder may configure the color-changing mechanism on transaction card 110 to reflect the cardholder's account status. In some embodiments, the cardholder may define, via an application on device 120 or by accessing his/her account via a website, a first threshold at which transaction card 110 may change from a first color to a second color, and the cardholder may set a second threshold at which transaction card 110 may change from the second color to a third color. In some embodiments, the color change may occur when the cardholder approaches the threshold values. For example, a cardholder may have a credit limit of S5000 and define the first threshold at 3000 and the second threshold at S4000. When the cardholder spends more than 3000 in a billing cycle (e.g. a month), transaction card 110 may change from a first color, such as green, to a second color, such as yellow. Similarly, if the cardholder's spending exceeds S4000, transaction card 110 may change from the second color (i.e. yellow) to a third color, such as red. When the cardholder posts a payment to his/her card, transaction card 110 may revert to a previous color. For instance, if transaction card 110 is the third color and the cardholder makes a payment that brings the cardholder's account below both thresholds, transaction card 110 may change from the third color to the first color. If the payment only lowers the cardholder's account below the second threshold, transaction card 110 may change from the third color to the second color.

In another example, the cardholder may configure the color-changing to alert the cardholder when the cardholder's balance goes below a certain amount, for example, when using a debit card. In this regard, the first threshold may be set at a S1000 and the second threshold at S500. Accordingly, when the cardholder's account goes below S1000, transaction card 110 may change from the first color to the second color. When the cardholder's account is less than 500, the debit card may change from the second color to the third color. Similar to the discussion above, transaction card 110 may change from the third color to the first color when the cardholder's account goes above both thresholds. For example, if the cardholder receives a direct deposit which brings his/her account above both thresholds.

It will be appreciated that the examples discussed above are merely illustrative. In some instances, the first, second, and third colors may be configurable may the cardholder. Additionally, the cardholder may be able to establish more, or fewer, thresholds.

In further examples, the cardholder may configure the color-changing component of the transaction card to provide security alerts. For instance, the transaction card may change color, for example, in response to one or more indicators of fraud being detected. The one or more indicators of fraud may be detected by the card issuer. Further, the one or more indicators of fraud may include, adding a new card holder, a phone number change, an email change, a password change, unusual spending activity, etc. The transaction card may change to a particular color to notify the cardholder of security alert. Alternatively, the color of the transaction card may be associated with the type of security alert. That is, the color of the transaction card may be indicative of the type of fraud indicator detected. For example, the transaction card may change to a first color to notify the cardholder of a change to their phone number and a second color to notify the cardholder of a change to their email address.

Along similar lines, the cardholder may configure the transaction card to change color in response to receiving a bill and/or invoice. In some examples, the color change may be indicative of overdue bills and/or invoices. In other examples, the color change may be indicative of upcoming payments, such as scheduled payments, automatic payments, and/or recurring payments. Additionally, or alternatively, the transaction card may be configured to change color, for example, after or in response to receiving a communication from the card issuer. In this regard, the color of the transaction card may indicate that the cardholder has a communication waiting for them. The cardholder may then log-in via a banking portal (e.g., via a mobile banking application or website) to access the communication.

In yet another example, the cardholder may configure the color-changing component of the transaction card to obfuscate personally identifiable information (PII). The cardholder may change the color of the transaction card to obfuscate the credit card number, the cardholder's name, a security code, and/or the expiration date of the transaction card. Additional examples may allow the cardholder to change the color of the transaction card for vanity purposes. Similarly, the cardholder may change the color of the transaction card to indicate that the card is no longer valid. The may allow the cardholder to notify others that the card is no longer valid and has been disposed of. Additionally, or alternatively, the color of the transaction card may be changed to indicate that a hold has been put on the cardholder's account or to indicate that card has been temporarily suspended. This may put vendors on notice that the transaction card is invalid, stolen, and/or a fake.

In some embodiments, the transaction card may change color in response to detecting that a terminal, such as card reader 130 and/or device 120, has been tampered with. In this regard, the transaction card may attempt to verify and/or authenticate the terminal before transacting with it. If the verification and/or authentication fails, the transaction card may determine that the terminal has been tampered with and change colors to convey the tampering to the cardholder.

It will further be appreciated that the examples discussed above are merely illustrative, and the color-changing transaction card may be configured to convey additional information to the cardholder in a variety of ways.

Card reader 130 may be any suitable card reader capable of reading data and/or information from transaction card 110. In this regard, card reader 130 may be a chip-based reader, a magnetic-based reader, an EMV reader, or any combination thereof. Accordingly, card reader 130 may include a display, a keypad, and a network interface. The display may be present information to the cardholder, such as the amount owed, the status of the transaction, and whether the transaction has been approved or denied. Keypad may allow a cardholder to input a PIN code, password, an amount for withdrawal, and the like. Network interface may be a wired connection, wireless connection, a short-range wireless connection, an NFC connection, or any combination thereof. Network interface may permit card reader 130 to communicate with server 140, via network 160, for example, to authorize a transaction. Similarly, network interface may permit card reader 130 to communicate with transaction card 110 and/or device 120. In these instances, card reader 130 may convey information related to the cardholder's account to transaction card 110 and/or device 120.

Server 140 may be any server capable of executing banking application 142. Additionally, server 140 may be communicatively coupled to database 150. In this regard, first server 140 may be a stand-alone server, a corporate server, or a server located in a server farm or cloud-computer environment. According to some examples, first server 140 may be a virtual server hosted on hardware capable of supporting a plurality of virtual servers.

Banking application 142 may be server-based software configured to provide cardholders with access to their account information and perform routing banking functions. In some embodiments, banking application 142 may be the server-based software that corresponds to the client-based software executing on device 120. Additionally, or alternatively, banking application 132 may provide cardholders access to their account information through a website accessed by device 120 via network 160.

Database 150 may be configured to store information on behalf of banking application 142. Banking information may include, but is not limited to, personal information, account information, and cardholder-preferences. Personal information may include a cardholder's name, address, phone number (i.e, mobile number, home number, business number, etc.), social security number, cardholder name, password, employment information, family information, and any other information that may be used to identify the first cardholder. Account information may include account balances, bill pay information, direct deposit information, wire transfer information, statements, and the like. Cardholder-preferences may define one or more spending thresholds, how cardholders receive notifications and alerts, spending notifications, and the like. Database 150 may include, but is not limited to, relational databases, hierarchical databases, distributed databases, in-memory databases, flat file databases, XML databases, NoSQL databases, graph databases, and/or a combination thereof.

Network 160 may include any type of network. In this regard, first network 160 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/ or Pretty Good Privacy (PGP) encryption. In many embodiments, one or more web services may be implemented within the various computing devices. Web services may be accessed by authorized external devices and cardholders to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
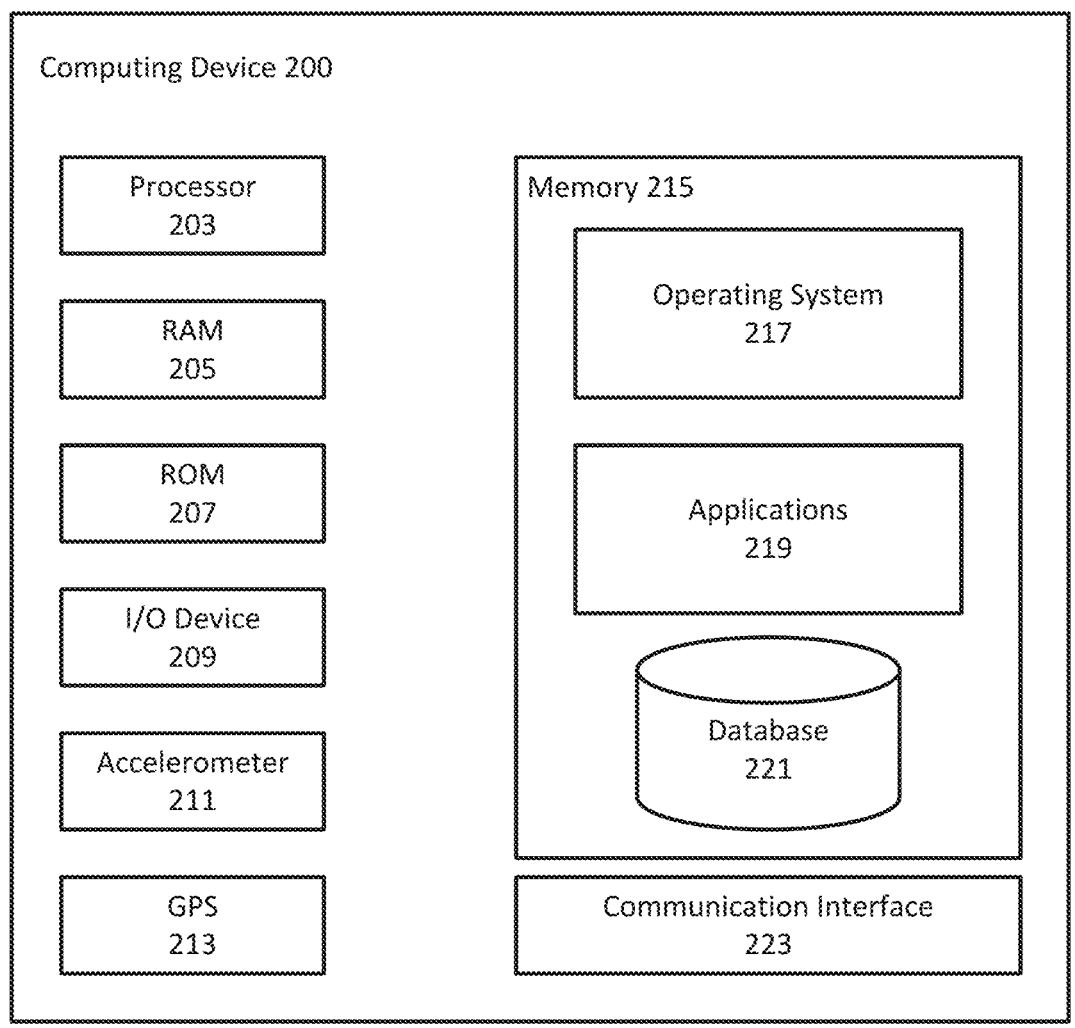
FIG. 2 shows an example of a computing device in accordance with one or more aspects of the disclosure.

Any of the devices and systems described herein may be implemented, in whole or in part, using one or more computing systems described with respect to FIG. 2. Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, accelerometer 211, global-position system antenna 213, memory 215, and/or communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, electronic terminals, transactional terminals, and the like, and/or any other type of data processing device.

Input/output (I/O) device 209 may include a microphone, keypad, touch screen, and/or stylus through which a cardholder of the computing device 200 may provide input, and may also include one or more of a speaker for providing audio output and a video display device for providing textual, audiovisual, and/or graphical output. In some embodiments, I/O device 209 may include an image capture device.

Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first cardholder. In the context of a banking application, GPS receiver/antenna 213 may be used to locate one or more banking locations.

Communication interface 223 may include one or more transceivers, digital signal processors, and/or additional circuitry and software for communicating via any network, wired or wireless, using any protocol as described herein. Communication interface 223 may also include near field communication (NFC) capabilities, short-range wireless communication capabilities (e.g., Bluetooth®), wireless communication capabilities (e.g., Wi-Fi), or any combination thereof.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

A transaction card may include a color-changing mechanism to provide one or more alerts to a cardholder. As discussed above, the alerts may indicate that the account has gone above a spending threshold set by the cardholder. Alternatively, the alerts may indicate when an account balance has gone below a certain amount, such as debit card transactions. The following embodiments described several techniques for effectuating the color changing mechanism.

Microparticle-Based Medium

Figure 3:
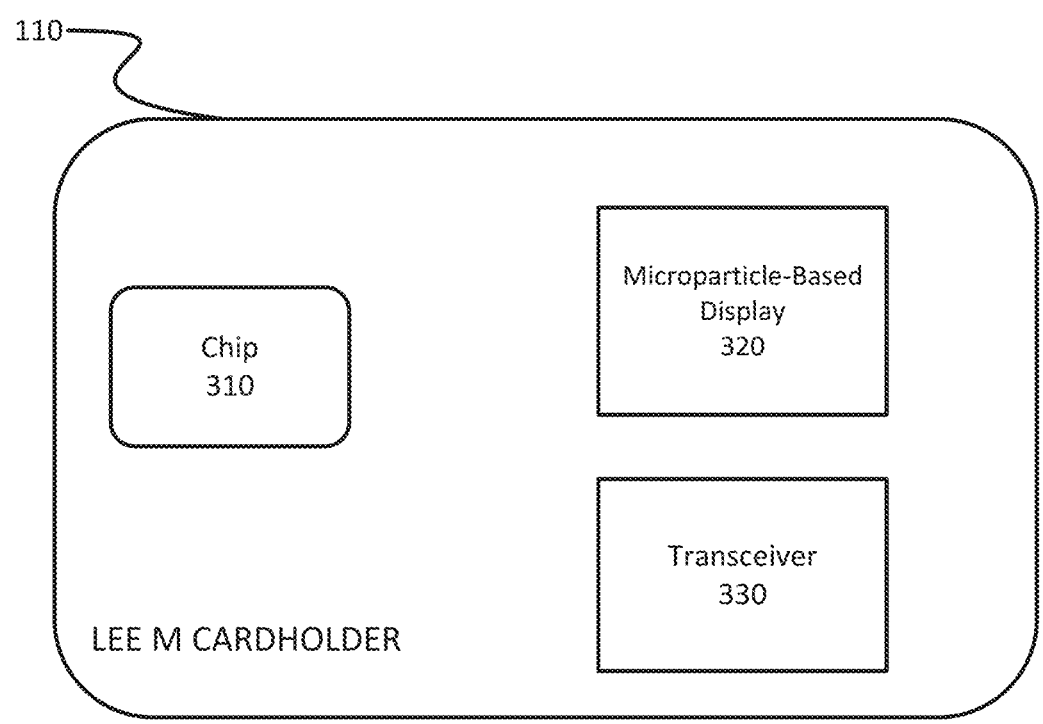
FIG. 3 shows a color changing transaction card with a microparticle-based medium in accordance with one or more aspects of the disclosure.

Color-changing transaction cards may include a power source built-in to the card to effectuate the color change. If, however, a cardholder forgets to charge his/her card or the power source is simply drained, the color change may not occur, thereby rendering the cardholder's alerts moot. In order to overcome the shortcomings of prior color-changing transaction cards, the present embodiment may provide a microparticle-based medium, such as those found in e ink and e paper applications, to effectuate a color change that may not require a power source located on the transaction card. FIG. 3 shows a color changing transaction card with a microparticle-based medium in accordance with one or more aspects of the disclosure.

Turning to FIG. 3, transaction card 110 is shown. Transaction card 110 may be of a standard size and made of a substrate, such as plastic, metal, etc. Transaction card 110 may include chip 310, microparticle-based medium 320, and transceiver 330.

Chip 310 may be a smart chip or integrated circuit. In this regard, chip 310 may include a microprocessor and memory, such as read only memory (ROM) and random access memory (RAM). Additionally, chip 310 may include one or more contact pads to receive voltage to power the transaction card and exchange signals with a terminal, such as device 120 and/or card reader 130. In some instances, chip 310 may apply a voltage and/or signal received from device 120 and/or card reader 130 to microparticle-based medium 320 to change a color of transaction card 110. As will be explained in greater detail below, chip 310 may activate individual microcapsules, or pixels, of microparticle-based medium 330 to generate a color and/or image. In some embodiments, transaction card 110 may include a separate interface (not show) to receive voltage to power the microparticle-based medium 320. Additionally, or alternatively, chip 310 may be configured to execute one or more applications. The applications may allow chip 310 to process payments, for example, using a payment application. In other examples, the applications may allow chip 310 to perform cryptographic processing, authenticate transaction card 110, define risk management parameters (e.g., when the transaction may be conducted offline), digitally sign payment data, and verify the cardholder. In some embodiments, chip 310 may be a dual interface chip that provides for contact and contact-less interfaces.

Microparticle-based medium 320 may be any display that realizes a contrast due to the electromigration of microparticles contained in one or more microcapsules located in microparticle-based medium 320. In this regard, the microparticles may be electrically charged or polarized particles. Further, instead of microparticles, each microcapsule may contain at least a first plurality of nanoparticles of a first pigment and a second plurality of nanoparticles of a second pigment. A relatively low power (i.e. 1-3V DC) may cause microparticles in one or more capsules of a microparticle-based mediums to rearrange themselves to provide an image with high contrast and high reflectivity. In some embodiments, the microparticles may be black and white. That is, each microcapsule in microparticle-based medium 320 may include a plurality of black microparticles and a plurality of white microparticles suspended in a transparent fluid, such as an oil. The black and white microparticles may be used to generate black-and-white or grayscale images to alert the cardholder. For example, the images may be akin to traffic signs, with a triangle cautioning the cardholder about crossing a first threshold and an octagon (e.g. stop sign) may be used to indicate the cardholder crossing a second threshold. In some embodiments, the microparticles may be a plurality of colors, such as those found in the CMYK or RGB color models. For instance, there may be four colors of microparticles: cyan, magenta, yellow, and a key color, such as black or white. These four colors may generate hundreds of other colors. Accordingly, microparticle-based medium 320 may generate a plurality of colors to provide alerts and/or notifications to the cardholder. In operation, microparticle-based medium 320 may generate the same color as transaction card 110. In some instances, microparticle-based medium 320 may generate no color at all, such that the substrate (i.e. plastic or metal) may be presented. However, when a first threshold is met, microparticle-based medium may generate a first color, such as a cautionary color (i.e. yellow), and a second color, such as red, when a second threshold is met. While microparticle-based medium 310 is shown as a part of transaction card 110, it will be appreciated that microparticle-based medium 310 may comprise a substantial portion (i.e. ≥51%), or the entirety, of transaction card 110. The components of microparticle-based medium 320 will be discussed in greater detail below with respect to FIG. 4.

In alternative embodiments, the plurality of microparticles may be magnetically charged. In these embodiments, first electrode layer 420 and second electrode layer 440 may be configured to generate a magnetic field that causes the plurality of microparticles to migrate. In this regard, a first magnetic field may cause the microcapsule to present the first plurality of microparticles and a second magnetic field may cause the microcapsule to present the second plurality of microparticles. The first magnetic field and the second magnetic field may be generated in response to a signal received from chip 310. Alternatively, or additionally, the first magnetic field and the second magnetic field may be generated from a terminal, such as device 120 and/or card reader 130.

Transceiver 330 may be configured to exchange signals with a terminal. In some embodiments, transceiver 330 may include an antenna or other communication capabilities, such as NFC, Wi-Fi, and Bluetooth®. Transceiver 330 may be configured to permit transaction card 110 to communicate with card reader 130 and/or device 120. In other embodiments, transceiver 330 may comprise a short-range wireless transceiver configured to receive the voltage to power the transaction card and exchange signals with card reader 130 and/or device 120.

Figure 4:
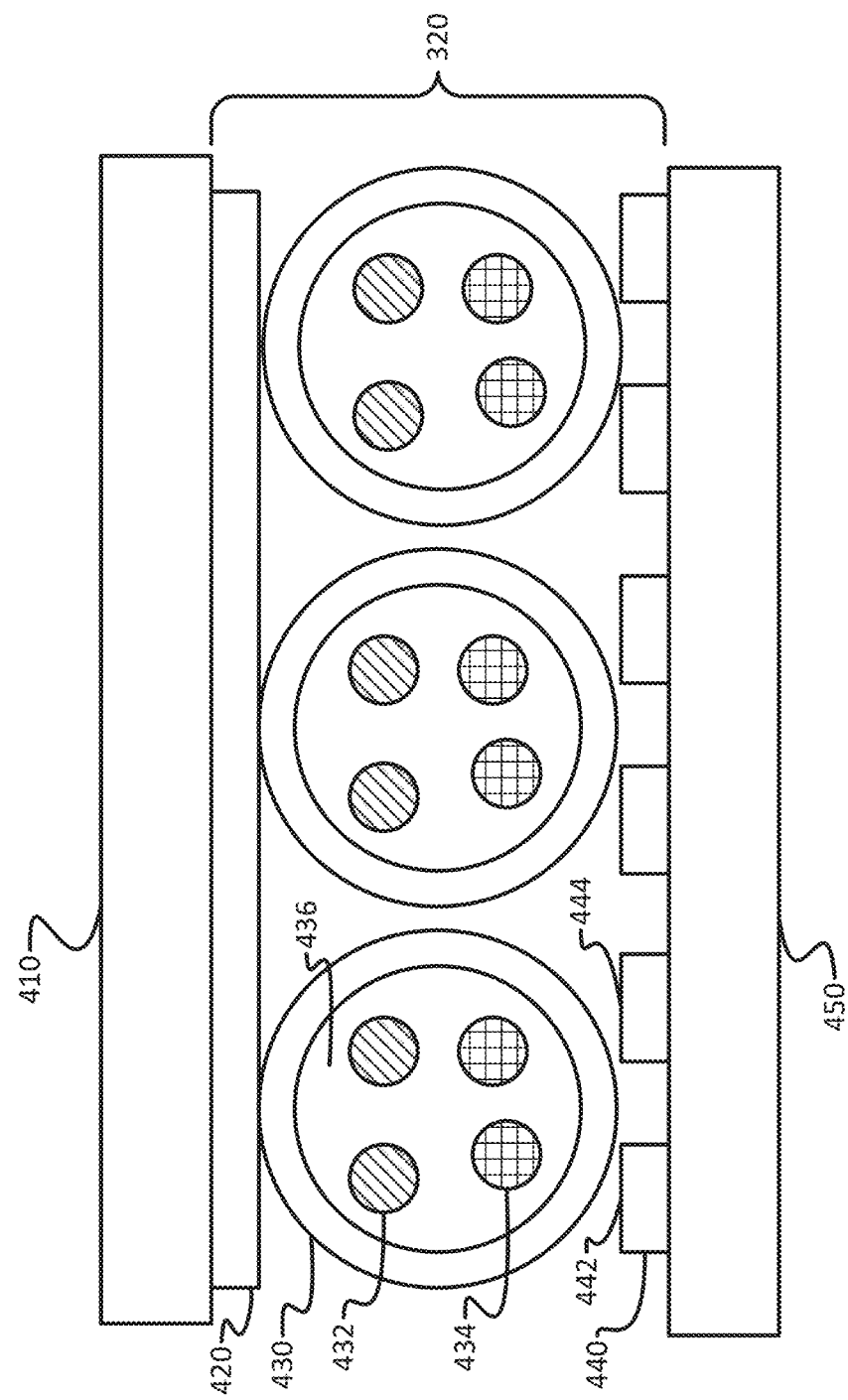
FIG. 4 shows a microparticle-based medium according to one or more aspects of the disclosure.

Microparticle-based medium 320 may be preferred over traditional color-changing techniques because microparticle-based medium 310 may effectuate a color change via a one-time voltage application, whereas traditional color-changing techniques may require a power source to be located on the transaction card. FIG. 4 shows a microparticle-based medium according to one or more aspects of the disclosure.

Turning to FIG. 4, microparticle-base display 320 may be disposed between a first substrate layer 410 and a second substrate layer 450. First substrate layer 410 and second substrate layer 450 may be the same material that transaction card 110 is made of. For example, first substrate layer 410 and second substrate layer 450 may be plastic, metal, or an equivalent material used in the manufacture of transaction cards. Alternatively, first substrate layer 410 and second substrate layer 450 may be transparent films. In some embodiments, first substrate layer 410 may be a transparent film and second substrate layer 420 may be the same material used in the manufacture of transaction card 110. In these examples, first substrate layer 410 may include a color filter overlay produce various shades and/or hues of the image or color generated by microparticle-base display 320.

Microparticle-based medium 320 may include a first electrode layer 420, a second electrode layer 440, and a plurality of microcapsules 430 disposed between first electrode layer 420 and second electrode layer 440. First electrode layer 420 may comprise a transparent material. For example first electrode layer 420 may comprise transparent conducting films, like indium tin oxide (ITO), fluorine doped tin oxide (FTO), doped zinc oxide, transparent conductive oxides (TCO), conductive polymers, metal grids, carbon nanotubes, graphene, nanowire meshes, ultra-thin metal films, or any equivalents. Second electrode layer 440 may also comprise a transparent material, such as the transparent conducting films discussed above. Alternatively, second electrode layer 440 may include an electrode pixel layer, which may define a plurality of contact pads or plates for each of the plurality of microcapsules. FIG. 4 illustrates an example of a first contact pad 442 and a first second contact pad 444 for first microcapsule 430. An electrode pixel layer may provide a plurality of lead lines arranged in a grid pattern for more granular control for individual microcapsules. In this regard, the electrode pixel layer may generate one or more electrical fields that cause the microparticle-based medium to present one or more colors. For example, electrode pixel layer may cause a first color to be presented by a first microcapsule and a second color to be presented by a second microcapsule that may be adjacent to the first microcapsule. For example, first contact pad 442 and second contact pad 444 may generate a first electrical charge that generates the electrical field, which may cause the first microcapsule to present a first plurality of microparticles of a first pigment, while a third contact pad and a fourth contact pad may generate a second electrical field from a second electrical charge, different from the first electrical charge, that causes second microcapsule to present a second plurality of microparticles of a second pigment. In some embodiments, first contact pad 442 and second contact pad 444 may have different electrical charges, which may cause first microcapsule to present a combination of the first plurality of microparticles of the first pigment and the second plurality of microparticles of the second pigments. Accordingly, the electrode pixel layer may be used to generate various shades and hues of colors, as well as images. In some embodiments, first contact pad 442 may be located in first electrode layer 420 and second contact pad 444 may be located in second electrode layer 440.

In order to generate the colors, one or more electrical charges may be applied to second electrode layer 440 that causes the migration of microparticles contained in the microcapsules to rearrange. Microcapsule 430 illustrates one example of the plurality of microcapsules described herein. In this regard, microcapsule 430 may be made of a transparent material and include a first plurality of microparticles 432, a second plurality of microparticles 434, and a transparent fluid 436. Transparent fluid 436 may be any suitable fluid that allows for the rearrangment and/or movement of first plurality of microparticles 432 and second plurality of microparticles 434, such as a transparent oil or an electrolyte.

First plurality of microparticles 432 may be a first pigment (i.e. color), while second plurality of microparticles 434 may be a second pigment different from the first. Applying an electrical charge may cause the first plurality of microparticles 432 and second plurality of microparticles 434 to rearrange to produce a color or image. For example, a first electrical charge may cause the first plurality of microparticles of the first pigment to be displayed. Similarly, a second electrical charge may cause the second plurality of microparticles of the second pigment to be displayed. In some embodiments, a third electrical charge may cause a combination of the first plurality of microparticles and the second plurality of microparticles to be displayed. By applying various voltages and electrical charges to rearrange the microparticles, all, or a portion, of transaction card 110 may appear the color associated with the microparticles displayed via microparticle-based medium 320. As noted above, first microcapsule 430 may include a third plurality of microparticles of a third pigment and a fourth plurality of microparticles of a fourth pigment. In these examples, the microparticles may be cyan, magenta, yellow, and white, which may be used to generate a plurality of colors and/or images.

As discussed above, using microparticle-based medium, such as those found in e ink and e paper applications, to effectuate a color change in a transaction card represents an improvement over traditional color changing transaction cards that require a power source. In this regard, applying a first voltage or electrical charge, such as one received from device 120 and/or card reader 130, may change the color of transaction card 110. Transaction card 110 may remain the color until transaction card 110 receives a second voltage or electrical charge. Moreover, microparticle-based medium does not require a power sourced on transaction card 110 to maintain the color. Thus, the color will not revert back to a previous color if the power source is drained or a cardholder forgets to charge the card.

Electrochemical Cell

Figure 5:
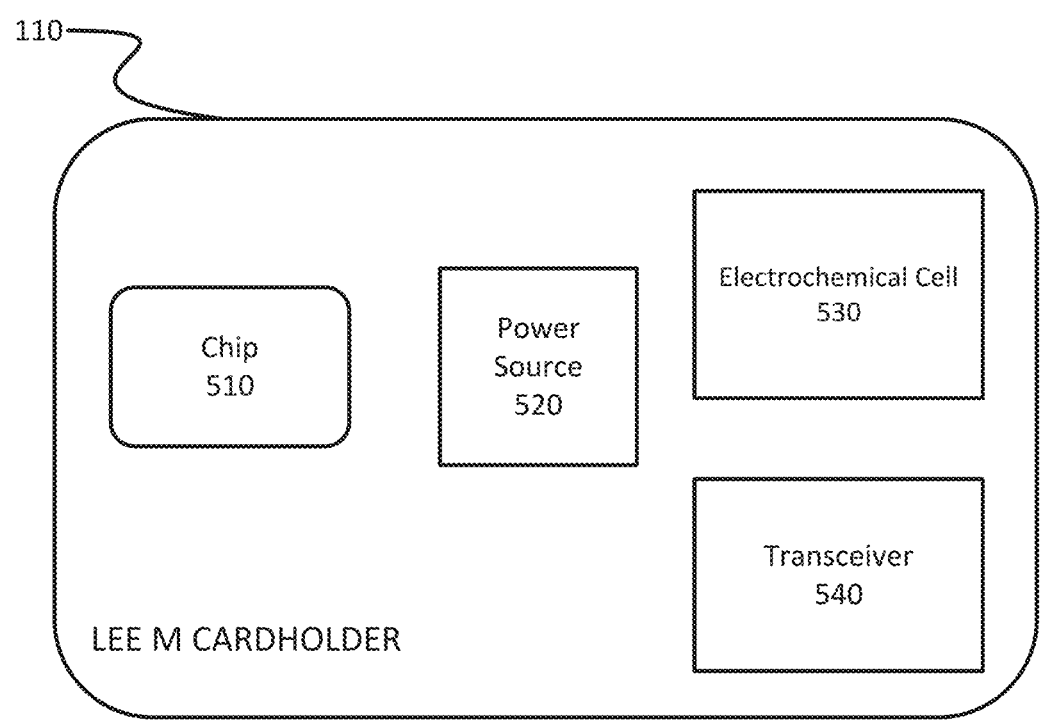
FIG. 5 shows a color changing transaction card with an electrochemical cell in accordance with one or more aspects of the disclosure.

In some embodiments, a transaction card may include an electrochemical cell. In this regard, electrochemical cells may effectuate a quick color-change (i.e., ~200 ms) using low voltage (i.e., ~1-3V DC). Furthermore, little, or no, power may be required to maintain the color-change. This is known as memory effect. The present embodiment describes the use of an electrochemical cell to change a color on a transaction card. FIG. 5 shows a color changing transaction card 110 with an electrochromic cell in accordance with one or more aspects of the disclosure.

Turning to FIG. 5, transaction card 110 is shown. Transaction card 110 may include chip 510, power source 520, electrochemical cell 520, and transceiver 540. As noted above, transaction card 110 may be of a standard size and made of a substrate, such as plastic, metal, etc.

Chip 510 may be similar to chip 310 described above. In this regard, chip 510 may be a smart chip or integrated circuit that includes a microprocessor and memory. Further, chip 510 may include one or more contact pads to receive voltage to power the transaction card and exchange signals with a terminal. Like chip 310, chip 510 may apply a voltage and/or signal received from device 120 and/or card reader 130 to electrochemical cell 530 to change a color of transaction card 110.

Power source 520 may be a battery or some other portable power supply capable of providing power to transaction card 110. In some instances, transaction card 110 may include a charging port (not shown) to receive a cable to supply power to recharge power source 520. In other embodiments, power source 520 may include an inductive coil to recharge the power supply via electromagnetic induction. In still further embodiments, power source 520 may include one or more solar cells configured to provide power to transaction card 110.

Electrochemical cell 530 may be any mechanism that generates a color in response to an electrical charge or current being applied thereto. As noted above, a relatively low power (i.e. 1-3V DC) may cause a chemical reaction that generates a color. In some embodiments, a plurality of electrochemical cells may be located on transaction 110, with each electrochemical cell generating a different color. For example, a first electrochemical cell may generate a first color, a second electrochemical cell may generate a second color, and so on. The plurality of electrochemical cells may be used to provide different alerts and notifications to the cardholder. The details of electrochemical cell 530 will be discussed in greater detail below with respect to FIG. 6.

Like transceiver 330, transceiver 530 may be configured to receive a voltage to power transaction card 110 and exchange signals with device 120 and/or card reader 130. Transceiver 530 may include an antenna or other communication capabilities, such as NFC, Wi-Fi, and Bluetooth®. In other embodiments, transceiver 330 may comprise a short-range wireless transceiver configured to receive the voltage to power the transaction card and exchange signals with device 120 and/or card reader 130.

Figure 6:
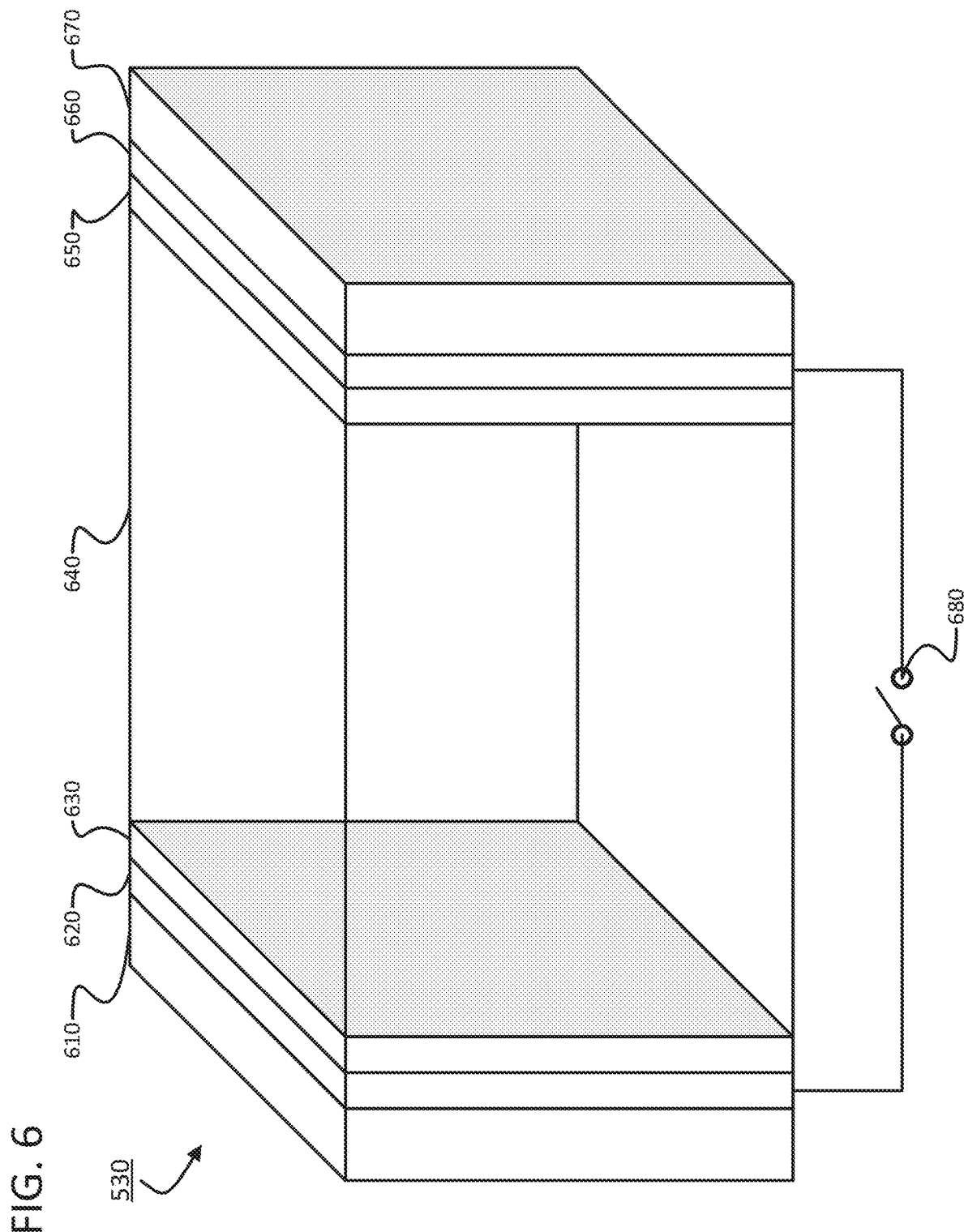
FIG. 6 shows an electrochemical cell according to one or more aspects of the disclosure.

Electrochemical cell 530 may be preferred over traditional color-changing techniques because electrochemical cell 530 may effectuate a color change via a one-time voltage application and require little to no power to maintain the color change. FIG. 6 shows an electrochemical cell according to one or more aspects of the disclosure.

Turning to FIG. 6, electrochemical cell 530 may be disposed between a first substrate layer 610 and a second substrate layer 670. Like the substrate layers described above, first substrate layer 610 and second substrate layer 670 may be the same material as transaction card 110. Alternatively, first substrate layer 610 and second substrate layer 670 may be transparent films. In some embodiments, first substrate layer 610 may be a transparent film and second substrate layer 670 may be the same material used in the manufacture of transaction card 110.

Electrochemical cell 530 may include a first electrode layer 620, a doped film 630 on a surface of first electrode 620, a second electrode layer 660, an electrochromic film 650, and a conductive material 640 disposed between doped film 630 on first electrode layer 620 and the electrochromic film 650 on second electrode layer 660. Electrochemical cell 530 may include a transistor 680, or switch, that may be closed to enable the flow of current from first electrode layer 620, through electrochromic material 640, to second electrode layer 660 to effectuate the color change. In some embodiments, transistor 680 may be communicatively coupled to chip 510. In this regard, chip 510 may provide a signal that closes transistor 680 to enable the flow of current from first electrode layer 620 to second electrode layer 660. In alternative embodiments, doped film 630 and electrochromic film 650 may be eliminated, and conductive material 640 may be replaced with an electrochromic material disposed between first electrode 620 and second electrode 660. The electrochromic material may be tungsten oxide ($WO_3$), molybdenum oxide, a viologen (e.g. 4,4'-bipyridine), an electrochromic polymer (ECPs), a metal coordination complex (e.g. 2,2'-bipyridine), or any equivalent thereof.

First electrode layer 620 may be made of a transparent material, such as a transparent conducting film. In some embodiments, second electrode layer 440 may also comprise a transparent material. Alternatively, second electrode layer 440 may include a material with a reflective coating. In some embodiments, first electrode layer 620 and second electrode layer 640 may be made of a thin film, such as polyethylene terephthalate (PET), that has been doped with a conducting metal, such as tin, fluorine, antimony, or an equivalent thereof.

In some embodiments, first electrode layer 630 may include doped film 630 on one surface, preferably the surface proximate to conductive material 640. Similarly, second electrode layer 660 may include electrochromic film 650 disposed on one surface. In alternative embodiments, second electrode layer may be made of a reflective material, or a material with a reflective coasting. Electrochromic film 650 may be disposed on the surface proximate to conductive material 640. In some embodiments, the conductive material includes an electrolyte in liquid, gel, or solid form. In operation, transistor 680 may close, enabling a current to flow from first electrode 630 and doped film 630, through conductive material 640, and to electrochromic film 650 and second electrode 660. In some embodiments, electrochromic cell may be capable of switching between a plurality of colors in response to different currents. For example, a first current, or electrical charge, may cause electrochromic cell to generate a first color, while a second current, or electrical charge, may cause electrochromic cell to generate a second color different from the first color. Alternatively, or additionally, a plurality of electrochromic cells may be disposed on transaction card 110. A first set of one or more of the plurality of electrochromic cells may be configured to generate a first color and, therefore, provide a first alert to the cardholder; while a second set of one or more of the plurality of electrochromic cells may be configured to generate a second color and, therefore, provide a second alert to the cardholder. Additional sets of electrochromic cells may be used to provide different colors and/or images and alerts to the cardholder.

An electrochemical cell to change the color of a transaction card as part of an alert to the cardholder represents an improvement over traditional color-changing transaction cards since the color change may be realized using a low voltage and the color change may remain in effect with little to no power. As noted above, traditional color-changing transaction cards require a power source to change and maintain a change in color. An electrochemical cell requires little power to change the color, and little to no power to maintain the color change. Thus, using an electrochemical cell to change the color of a transaction card to provide an alert to a cardholder will not revert back to a previous color if the power source is drained or when a cardholder forgets to charge the transaction card.

Liquid Crystal Field

Figure 7:
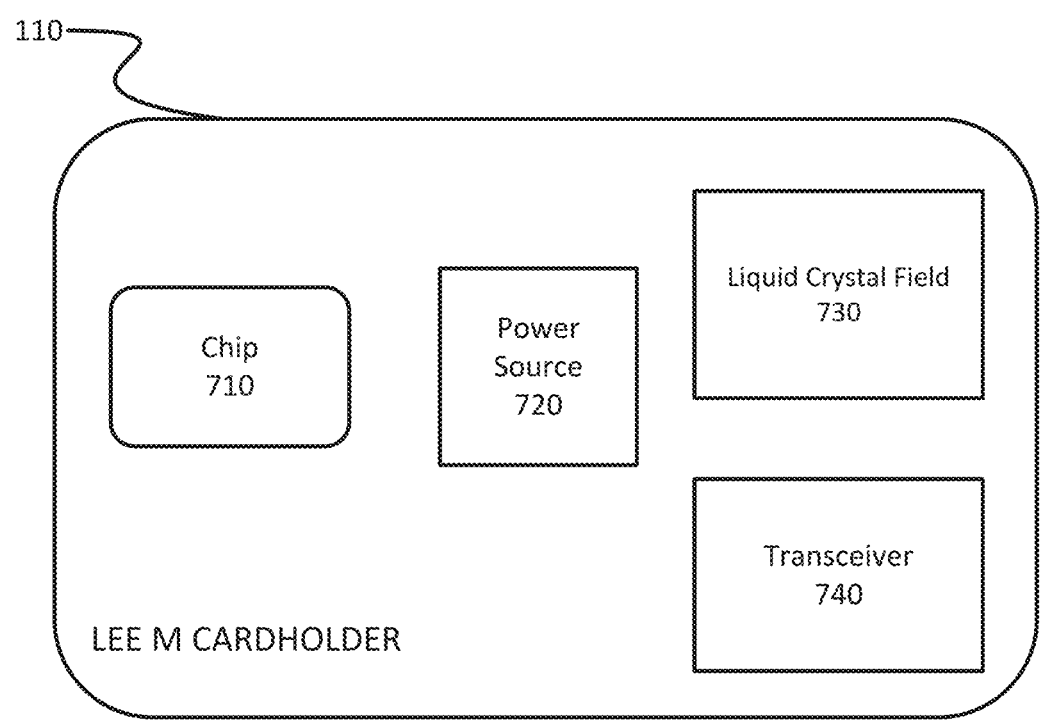
FIG. 7 shows a color changing transaction card with a liquid crystal field in accordance with one or more aspects of the disclosure.

In alternative embodiments, transaction card 110 may include liquid crystal field. Liquid crystal fields may effectuate a temporary color-change to provide alerts and/or notifications to a cardholder. In the current embodiment, a transaction card with a liquid crystal field is described to provide a cardholder with an alert and/or notification. FIG. 7 shows a color changing transaction card 110 with a liquid crystal field in accordance with one or more aspects of the disclosure.

Turning to FIG. 7, transaction card 110 is shown. Transaction card 110 may include chip 710, power source 720, liquid crystal field 730, and transceiver 740. As noted above, transaction card 110 may be of a standard size and made of a substrate, such as plastic, metal, etc.

Chip 710 may be similar to chips described above. In this regard, chip 710 may include one or more contact pads to receive voltage to power transaction card 110 and exchange signals with device 120 and/or card reader 130. Further, chip 710 may apply a voltage and/or signal, received from device 120 and/or card reader 130, to liquid crystal field 730 to generate an alert and/or notification. In this regard, the alert and/or notification may be a color, an image, a pattern, or any combination thereof.

Power source 720 may be similar to the power source discussed above. In this regard, power source 720 may include a battery or some other portable power supply capable of providing power to transaction card 110. Transaction card 110 may include a charging port (not shown) to receive a cable to supply power to recharge power source 720. Alternatively, or additionally, power source 720 may include an inductive coil to recharge the power supply via electromagnetic induction. Power source 720 may include one or more solar cells configured to provide power to transaction card 110.

Liquid crystal field 730 may be any mechanism that manipulates a field of liquid crystals to generate a color, an image, a pattern, or an equivalent thereof. In this regard, liquid crystal field 730 may provide a temporary alert and/or notification to a cardholder. For example, when power is applied to liquid crystal field 730, for example—in response to a signal received from chip 710, device 120, card reader 130, or any combination thereof, liquid crystal field 730 may generate a color, image, pattern, or equivalent thereof that conveys the alert to the cardholder. When the power is removed, liquid crystal field 730 may return to a passive state. The passive state may be one in which liquid crystal field 730 does not display any color. In this regard, liquid crystal field 730 may be transparent, allowing the card material to be viewed through liquid crystal field 730. The components of liquid crystal field 730 will be discussed in greater detail below with respect to FIG. 8.

Similar to the transceivers described above, transceiver 730 may be configured to receive a voltage to power transaction card 110 and exchange signals with device 120 and/or card reader 130. Accordingly, transceiver 530 may include an antenna, a short-range wireless transceiver, or other communication capabilities, such as NFC, Wi-Fi, and Bluetooth®.

Figure 8:
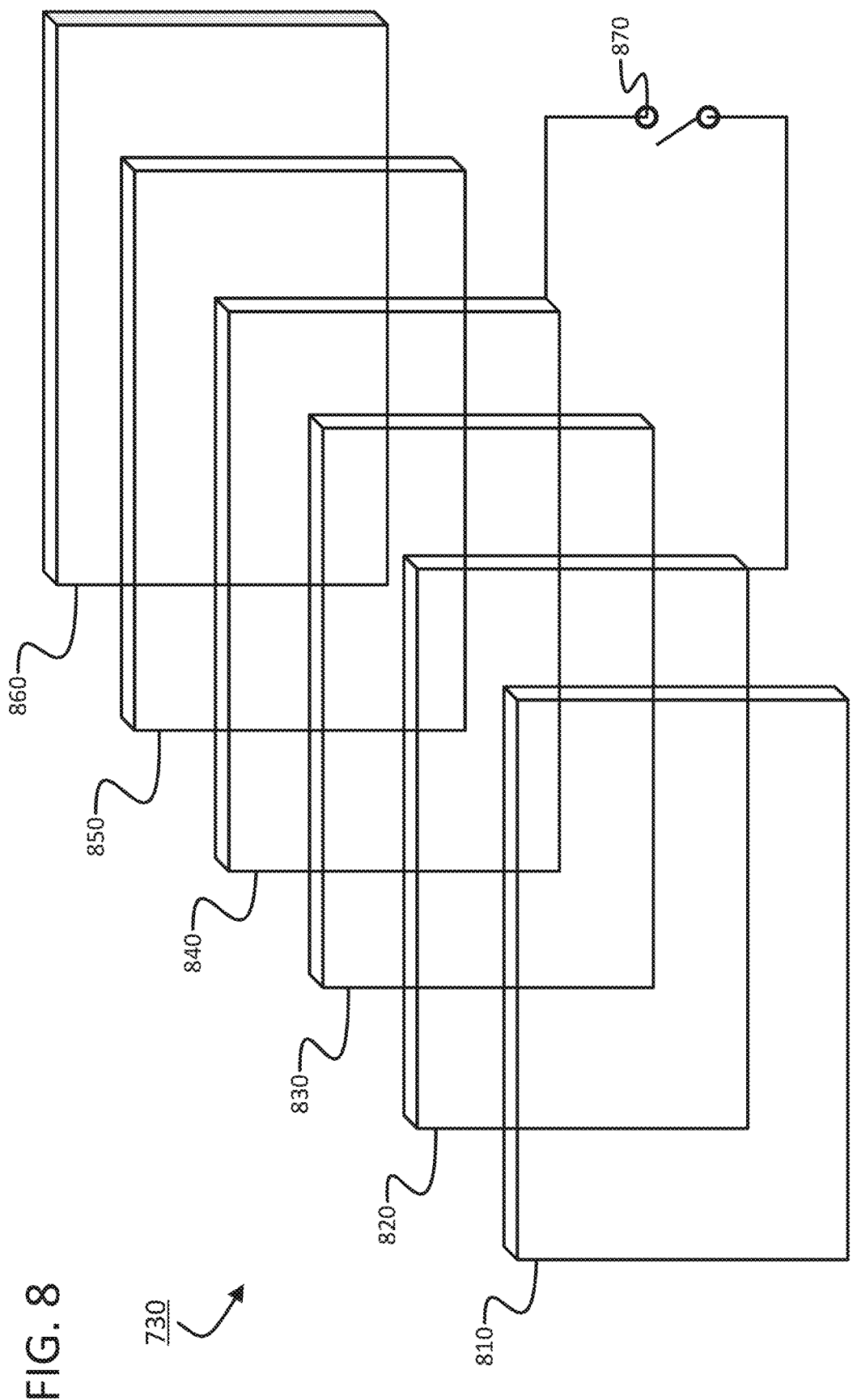
FIG. 8 shows a liquid crystal field according to one or more aspects of the disclosure.

Turning to FIG. 8, liquid crystal field 730 may be disposed between a first substrate layer 810 and a second substrate layer 860. First substrate layer 810 may be a transparent film. In some embodiments, first substrate layer 810 may be a polarizing filter film. For example, the polarizing filter film may include a vertical axis to polarize light as it enters liquid crystal field 730. Second substrate layer 860 may be the same material as transaction card 110. Alternatively, second substrate layer 860 may comprise a reflective surface. In further embodiments, second substrate layer 860 may be a light source. Additionally, or alternatively, second substrate layer 860 may have a polarizing film, such as film 850, disposed on a surface thereof. Film 850 may be a polarizing filter film in the horizontal axis.

First electrode 820, liquid crystal 830, and second electrode 850 may be located between first substrate layer 810 and second substrate layer 860. Transistor 870 may be communicatively coupled to first electrode 820, second electrode 850, and chip 710. In some embodiment, transistor 870 may be a switch configured to allow the flow of current from first electrode 820 to second electrode 850, which causes liquid crystal 830 to realign to change a color or generate an image or pattern. Transistor 870 may close, thereby allowing the current to flow between the electrodes, in response to a signal received from chip 710, device 120, card reader 130, or any combination thereof.

First electrode layer 820 may be made of a transparent material, such as glass or a transparent conducting film. In some instances, first electrode layer 820 includes a glass substrate and a doped film on a surface of the glass substrate. The other surface of the glass substrate may comprise first substrate layer 810. Similarly, second electrode layer 850 may also comprise a transparent material. In some embodiments, second electrode layer 850 may be made of glass and have a doped film located on a surface thereof.

Using a liquid crystal field to provide an alert and/or notification to a cardholder represents an improvement over traditional color-changing transaction cards. Liquid crystal fields may effectuate a temporary color-change to provide alerts and/or notifications to a cardholder. In the current embodiment, a transaction card with a liquid crystal field is described to provide a cardholder with an alert and/or notification.

Figure 9:
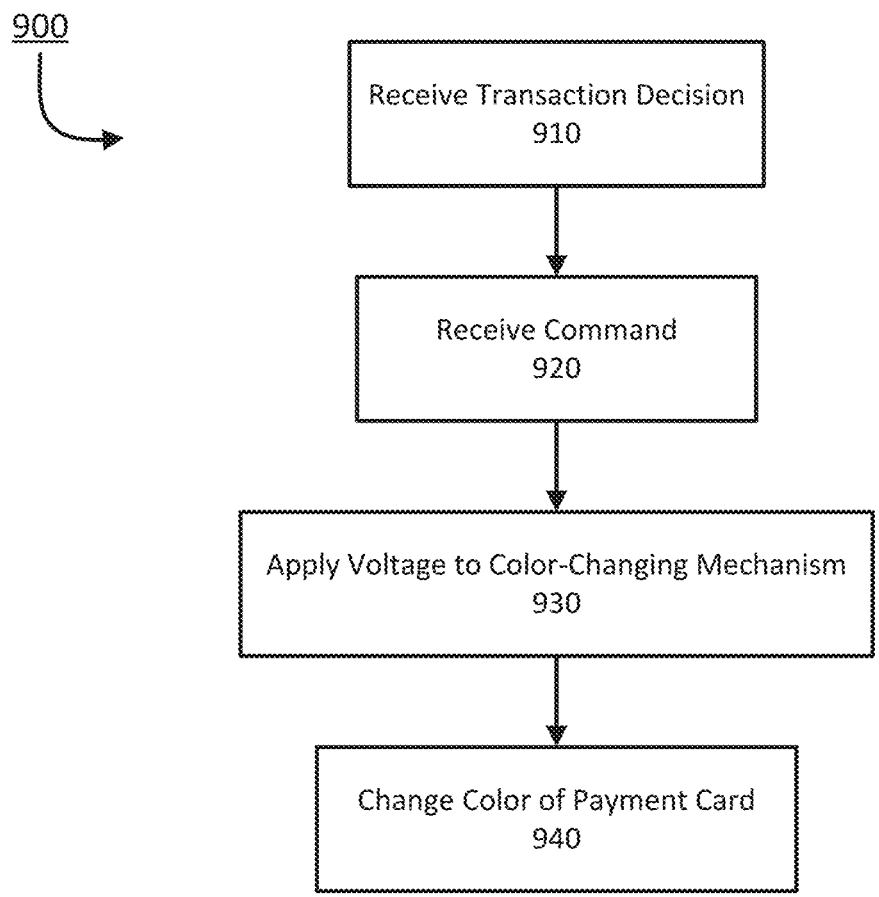
FIG. 9 shows a flow chart of a process for changing the color of a transaction card according to one or more aspects of the disclosure.

Given the embodiments discussed above, an exchange of signals may occur between transaction card 110 and either device 120 and/or card reader 130. FIG. 9 shows a flow chart of a process 900 for changing the color of a transaction card according to one or more aspects of the disclosure. Some or all of the steps of process 900 may be performed using the transaction card and/or one or more computing devices described herein.

Process 900 begins in block 910, with transaction card 110 receiving a transaction decision. As noted above, transaction card 110 may process payments, perform cryptographic processing, authenticate transaction card 110, define risk management parameters, digitally sign payment data, and verify the cardholder. While transaction card 110 may perform several functions, the transaction decision may come from device 120, card reader 130, server 140, or any combination thereof. In some embodiments, the transaction decision may be an approval or a denial. In block 9820, transaction card 110 may also receive a command. The command may come from an application running on device 120, card reader 130, server 140, or any combination thereof. In some embodiments, the command may indicate that the cardholder has exceeded one or more of their thresholds. Accordingly, the command may prompt the transaction card to change one or more colors to provide a notification to the cardholder that the cardholder has exceeded one or more of the thresholds. Alternatively, the command may indicate that the cardholder has gone below one or more of their thresholds. In this instances, the command may prompt the transaction card to clear any alerts and/or notifications and have the card return to its manufactured color. In some embodiments, the command may include a voltage or power to effectuate the color change. The voltage, or power, may come from device 120, card reader 130, a power source located on the transaction card, or any combination thereof. In block 930, transaction card 110 may apply the voltage to the color-changing mechanism. As discussed above, this may prompt all, or part, of transaction card 110 to change from a first color to a second color in block 940. This color change may remain in effect until transaction card 110 receives another command to change the color of the transaction card. Alternatively, the color change may have a temporary effect. For example, the color change may be a momentary change to alert and/or notify the cardholder, which eventually returns the transaction card to its manufactured color.

While the above-described process has been described as changing the color of a transaction card in response to a determination that one or more thresholds have been met or exceeded, it will be appreciated that process 900 may be repeated each time that the cardholder crosses one or more thresholds, in either direction. Accordingly, the transaction card may be used to indicate when the cardholder has exceeded their spending limits and/or their account has gone below a certain amount. Alternatively, the transaction card may also be sued to indicate when the cardholder's balance has gone below one or more thresholds or their account balance has gone above a designated amount.

By including a color-changing mechanism on a transaction card, a cardholder may have a better understanding of their spending habits and their account balances. Additionally, the techniques described herein may improve the communications that a cardholder has with their financial institution. Accordingly, a transaction card that is capable of providing one or more alerts via a color-changing mechanism located on the card may make the cardholder more fiscally responsible. Furthermore, having the capability of effectuating and maintaining the color change without a power supply built-in improves over existing designs that require a power supply and are incapable of providing alerts and/or notifications when the power supply is exhausted.

While the embodiments discussed above describe a color-changing transaction card, it will be appreciated that the embodiments, technologies, systems, and methods described herein may have applicability to other areas. For example, the color-changing techniques described herein may be implemented in a corporate identifier card (e.g., smart card). In this regard, different colors may be used to designate employees, contractors, and/or visitors. Furthermore, the color-changing corporate identifier card may be used to indicate when an employee has been terminated and the card is no longer valid. In another example, the color changing components described herein may be used on government issued IDs, such as a driver licenses and passports. The color changing techniques may be used to identify and label fraudulent government IDs. These examples should be interpreted as merely illustrative and one skilled in the art would recognize the general applicability of the techniques described herein.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A transaction card comprising:
   a microparticle-based medium, comprising:
   a first electrode layer;
   a second electrode pixel layer comprising:
   at least one first plate; and
   at least one second plate; and
   a plurality of microcapsules disposed between the first electrode layer and the second electrode pixel layer, wherein:
   a first microcapsule of the plurality of microcapsules, disposed between the first electrode layer, the at least one first plate, and the at least one second plate, comprises:
   a first plurality of microparticles of a first pigment;
   a second plurality of microparticles of a second pigment; and
   a transparent fluid, wherein the at least one first plate and the at least one second plate are configured to generate a first electrical charge that causes the first microcapsule to display a first color;
   a second microcapsule of the plurality of microcapsules, disposed between the first electrode layer, at least one third plate, and at least one fourth plate, comprises:
   a third plurality of microparticles of the first pigment;
   a fourth plurality of microparticles of the second pigment; and
   the transparent fluid, wherein the at least one third plate and the at least one fourth plate are configured to generate a second electrical charge that causes a second microcapsule of the plurality of microcapsules to display a second color different from the first color;
   an integrated circuit configured to:
   execute signals received from a point-of-sale terminal;
   receive, from the point-of-sale terminal and not from a power supply located on the transaction card, voltage to generate the first electrical charge and the second electrical charge; and
   receive, from the point-of-sale terminal, an instruction to apply the voltage to generate the first electrical charge to display the first color and the second electrical charge to display the second color, wherein the instruction is based on a determination, by a third party, that a cardholder has exceeded a first threshold.

2. The transaction card of claim 1, wherein the first electrode layer comprises a transparent material.

3. The transaction card of claim 1, wherein the integrated circuit is configured to:
send a first signal to at least one of the at least one first plate and the at least one second plate to cause the first microcapsule to display the first color; and
send a second signal to at least one of the first plate and the at least one second plate to cause the first microcapsule to display the second color, wherein the first color is displayed at least in part due to the first plurality of microparticles, and the second color is displayed at least in part due to the second plurality of microparticles.

4. The transaction card of claim 3, wherein the integrated circuit is configured to:
send a third signal to at least one of the at least one first plate and the at least one second plate to cause the first microcapsule to display a third color, and
the third color is displayed at least in part due to the first and second plurality of microparticles.

5. The transaction card of claim 1, wherein the microparticle-based medium comprises a color filter overlay.

6. The transaction card of claim 1, wherein the first microcapsule further comprises:
a third plurality of microparticles of a third pigment, wherein the first microcapsule is configured to generate more than three colors by using the first plurality of microparticles, the second plurality of microparticles, and the third plurality of microparticles.

7. The transaction card of claim 1, wherein the first microcapsule further comprises
a third plurality of microparticles of a third pigment, and
a fourth plurality of microparticles of a fourth pigment, wherein the first pigment is cyan, the second pigment is magenta, the third pigment is yellow, and the fourth pigment is white.

8. The transaction card of claim 1, comprising:
a first contact pad and a second contact pad configured to provide electrical connectivity with the point-of-sale terminal.

9. The transaction card of claim 1, comprising:
a short-range wireless transceiver configured to receive from the point-of-sale terminal the voltage applied to the microparticle-based medium.

10. The transaction card of claim 1, wherein the transparent fluid is an electrolyte.

11. The transaction card of claim 1, wherein the transparent fluid is an oil.

12. The transaction card of claim 1, wherein the third party comprises a server associated with an issuer of the transaction card.

13. The transaction card of claim 1, wherein the third party comprises the point-of-sale terminal.

14. A method comprising:
receiving, at a transaction card from a point-of-sale terminal, a command related to a status of a cardholder's account, wherein the command comprises an instruction to provide an alert to the cardholder based on a determination, by a third party, that the cardholder's account has exceeded a first threshold;
receiving, by the transaction card, from the point-of-sale terminal, and not from a power supply located on the transaction card, a first voltage and a second voltage; and
applying, by the transaction card, based on the command, the first voltage to at least one first electrode associated with a first pixel of a color-changing mechanism to generate a first color associated with the alert; and
applying, by the transaction card, based on the command, the second voltage to at least one second electrode associated with a second pixel of a color-changing mechanism to generate a second color associated with the alert, wherein the second color is different from the first color.

15. A transaction card comprising:
a microparticle-based medium comprising:
a first electrode layer;
a second electrode pixel layer comprising:
at least one first plate; and
at least one second plate; and
a plurality of microcapsules disposed between the first electrode layer and the second electrode pixel layer, wherein:
a first microcapsule of the plurality of microcapsules, disposed between the first electrode layer, the at least one first plate, and the at least one second plate, comprises a plurality of microparticles, wherein the plurality of microparticles comprises:
microparticles of a first pigment; and
microparticles of a second pigment; and
a second microcapsule of the plurality of microcapsules, disposed between the first electrode layer, at least one third plate, and at least one fourth plate, comprises a plurality of microparticles, wherein the plurality of microparticles comprises:
microparticles of the first pigment; and
microparticles of the second pigment,
an integrated circuit configured to:
execute signals received from a point-of-sale terminal;
receive, from the point-of-sale terminal and not from a power supply located on the transaction card, voltage to cause a color of the transaction card to change;
receive, from the point-of-sale terminal, an instruction to apply the voltage to cause the color of the transaction card to change, wherein the instruction is based on a determination, by a third party, that a cardholder has exceeded a first threshold.

16. The transaction card of claim 15, wherein:
applying a first voltage to the first microcapsule and second microcapsule causes a first color to be displayed; and
applying a second voltage to the first microcapsule and the second microcapsule causes a second color to be displayed.

* * * * *